United States Patent
Lamprecht (10) Patent No.: US 9,864,735 B1
(45) Date of Patent: Jan. 9, 2018

(54) IN-DOMAIN WEBPAGE EDITING

(71) Applicant: Google Inc., Mountain View, CA (US)

(72) Inventor: Jaren Lamprecht, Irvine, CA (US)

(73) Assignee: Google LLC, Mountain View, CA (US)

( * ) Notice: Subject to any disclaimer, the term of this patent is extended or adjusted under 35 U.S.C. 154(b) by 245 days.

(21) Appl. No.: 14/837,239

(22) Filed: Aug. 27, 2015

(51) Int. Cl.
  *G06F 17/30* (2006.01)
  *G06F 17/22* (2006.01)
  *G06F 17/24* (2006.01)
(52) U.S. Cl.
  CPC .......... *G06F 17/2247* (2013.01); *G06F 17/24* (2013.01); *G06F 17/30876* (2013.01)
(58) Field of Classification Search
  None
  See application file for complete search history.

(56) References Cited

U.S. PATENT DOCUMENTS

| | | | |
|---|---|---|---|
| 8,418,131 B2 | 4/2013 | Emmelmann | |
| 8,522,134 B1 | 8/2013 | Zetlen | |
| 8,839,093 B1 | 9/2014 | Siroker et al. | |
| 2003/0023632 A1* | 1/2003 | Ries | G06F 17/3089 715/235 |
| 2004/0143822 A1 | 7/2004 | Jager et al. | |
| 2005/0240869 A1* | 10/2005 | Leetaru | G06F 17/30861 715/234 |
| 2008/0040661 A1 | 2/2008 | Curtis et al. | |
| 2008/0294750 A1 | 11/2008 | Kosonen | |
| 2009/0031210 A1 | 1/2009 | Backhouse | |
| 2009/0137202 A1 | 5/2009 | Fujimaki et al. | |
| 2011/0029854 A1 | 2/2011 | Nashi et al. | |
| 2013/0019189 A1 | 1/2013 | Stewart et al. | |
| 2014/0195889 A1 | 7/2014 | Hampton | |
| 2014/0344224 A1 | 11/2014 | Lebert et al. | |
| 2015/0106695 A1* | 4/2015 | Antipa | G06F 17/2247 715/235 |

FOREIGN PATENT DOCUMENTS

| | | |
|---|---|---|
| WO | WO-2004/068290 | 8/2004 |
| WO | WO-2010/011792 A2 | 1/2010 |

OTHER PUBLICATIONS

Extended European Search Report on 1518267.9 dated Feb. 5, 2016.
Extended European Search Report on 15182678.1 dated Feb. 15, 2016.

(Continued)

*Primary Examiner* — Asher D Kells
(74) *Attorney, Agent, or Firm* — Foley & Lardner LLP (57) ABSTRACT

Systems and methods for editing content of a webpage are provided. One method includes receiving an identifier of a webpage to be edited. The method further includes determining whether a current webpage to which a browser application has navigated is the webpage to be edited based on the identifier. The method further includes, in response to determining the current webpage is the webpage to be edited, generating an interface configured to receive revisions to content of the webpage, the interface provided within a domain of the webpage. The method further includes receiving the revisions to the webpage and generating revision data including the received revisions. The method further includes storing the revision data to a database for subsequent implementation within the webpage.

20 Claims, 6 Drawing Sheets

(56) References Cited

OTHER PUBLICATIONS

How Optimizely Works: Snippet Order of Execution, JavaScript Evaluation Timing, and Cookies, printed from Internet address: https://help.optimizely.com/hc/en-us/articles/200040335 on Jul. 16, 2015, 8 pages.
International Search Report and Written Opinion on PCT/US2016/048559 dated Nov. 18, 2016.
International Preliminary Report on Patentability on PCT/US16/48559 dated Aug. 25, 2017.

* cited by examiner

IN-DOMAIN WEBPAGE EDITING

BACKGROUND

A what-you-see-is-what-you-get (WYSIWYG) editor can be used to edit elements (e.g., text, font, formatting, etc.) of a webpage for experiments or to provide users with a personalized experience. For example, a website owner may change the title of his or her webpage and use that variation to do an experiment with 5% of website visitors, and see if it performs better than the original. Alternatively, the website owner may show that variation to a segment of the users, such as car owners in the U.S., as part of a personalized experience.

SUMMARY

One illustrative implementation of the disclosure relates to a method of editing content of a webpage. The method includes receiving, by one or more processors, an identifier of a webpage to be edited. The method further includes determining, by the one or more processors, whether a current webpage to which a browser application has navigated is the webpage to be edited based on the identifier. The method further includes, in response to determining the current webpage is the webpage to be edited, generating, by the one or more processors, an interface configured to receive revisions to content of the webpage, the interface provided within a domain of the webpage. The method further includes receiving, by the one or more processors, the revisions to the webpage and generating, by the one or more processors, revision data including the received revisions. The method further includes storing, by the one or more processors, the revision data to a database for subsequent implementation within the webpage.

Another implementation relates to a system. The system includes at least one computing device operably coupled to at least one memory. The at least one computing device is configured to receive an identifier of a webpage to be edited and determine whether a current webpage to which a browser application has navigated is the webpage to be edited based on the identifier. The at least one computing device is further configured to, in response to determining the current webpage is the webpage to be edited, generate an interface configured to receive revisions to content of the webpage, the interface provided within a domain of the webpage. The at least one computing device is further configured to receive the revisions to the webpage, generate revision data including the received revisions, and store the revision data to a database for subsequent implementation within the webpage.

Yet another implementation relates to one or more computer-readable storage media having instructions stored thereon that, when executed by one or more processors, cause the one or more processors to execute operations. The operations include receiving an identifier of a webpage to be edited, the identifier including at least a portion of a first uniform resource locator (URL) of the webpage to be edited. The operations further include receiving a second URL of a current webpage to which a browser application has navigated. The operations further include comparing the identifier to the second URL and determining the current webpage is the webpage to be edited in response to determining at least a domain of the second URL matches the identifier. The operations further include, in response to determining the current webpage is the webpage to be edited, generating an interface configured to receive revisions to content of the webpage, the interface including a first interface portion and a second interface portion. Generating the interface includes providing the first interface portion within an inline frame, providing the second interface portion outside the inline frame within a domain of the webpage, and establishing a communication channel between the first interface portion and the second interface portion in response to determining at least the domain of the second URL matches the identifier. The operations further include receiving the revisions to the webpage via the second interface portion and transmitting the revisions from the second interface portion to the first interface portion via the communication channel. The operations further include generating revision data including the received revisions and receiving an indication that the revisions are approved. The operations further include storing, by the first interface portion, the revision data to a database for subsequent implementation within the webpage, the second interface portion restricted from transmitting data to the database.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Referring generally to the Figures, various illustrative systems and methods are provided that may be used to provide a webpage editor (e.g., a WYSIWYG editor) for editing elements (e.g., text, font, formatting, etc.) of a webpage within a domain of the webpage. A WYSIWYG editor can be used to edit text of a webpage for experiments or to provide users with a personalized experience. Such an editor may be used to change various elements (e.g., HTML elements) of the data of a webpage.

Some editors are provided through a reverse-proxy method. Under a reverse-proxy method, the webpage is edited at a domain other than the domain from which the page originated. The webpage owner may provide the editing service the uniform resource locator ("URL") of the page to be edited, and the service may load the page within the domain of the service. Code is injected into the webpage using an editor with access to the webpage to implement changes.

Reverse-proxying can lead to various problems. For example, requests the page makes for content may be rejected by servers that do not whitelist the proxy domain's requests. Protocol-relative links can break if the protocol is elevated from Hypertext Transfer Protocol (HTTP) to Secure Hypertext Transfer Protocol (HTTPS) and the content is not available over HTTPS. Additionally, the proxy domain does not have access to user customizations (e.g., implemented within cookie data) at the original domain, so any customization associated with an account in the original domain will not be present in the editor (e.g., content behind a paywall or other login).

In some instances, implementations that employ reverse-proxying may also encounter some frame-busting limitations. For example, an owner who does not wish for content to appear within an inline frame next within another domain may employ frame-busting techniques. Such techniques may be natively enforced by browsers and/or enforced by scripts added to webpage data. In a reverse-proxy scenario, a URL of the top window (e.g., in the address bar) may be the URL of the editing application, and the content the user intends to edit may be proxied and placed in an iframe. In some implementations, a reverse-proxy server could remove the HTTP response headers, but it may be infeasible to detect all variations of custom frame-busting scripts. In such a scenario, the frame-busting content may not be editable by the editing application.

Various implementations of the present disclosure are configured to provide an interface to edit a webpage within the domain from which the webpage originates. An identifier of the webpage to be edited (e.g., a URL) may be received from a user (e.g., a website owner). The identifier may be used to determine whether a current webpage to which a browser application has navigated is the webpage to be edited. For example, the current URL may be monitored to determine whether the user previously indicated a desire to modify the webpage. If the URL is at least a partial match (e.g., if the domain matches), and an indication is received that the user wishes to edit the webpage (e.g., by entering a token appended to the webpage URL), an interface for editing the webpage may be generated.

The interface is provided within the domain from which the webpage originates. For example, in some implementations, the interface may be generated by injecting a script into the webpage. The script may be injected by any of several methods. In some implementations, the script may be injected by using a plugin to the browser application. In some implementations, the script may be injected using code already present in the webpage, such as code associated with providing dynamic content within a webpage and/or code associated with providing analytics regarding visitor activity on a webpage. In some implementations, the script may be injected using a bookmarklet, or application stored in a bookmark of the browser application.

In some implementations, the interface may be split into two parts. A trusted portion of the interface may communicate with a database storing changes for later implementation within the webpage. An untrusted portion of the interface may receive changes from the user and communicate the changes to the trusted portion. In some implementations, the trusted portion may wait to establish a communication channel with the untrusted portion until it is confirmed that the current webpage is the webpage to be edited (e.g., based on a match of the current URL with the previously provided URL to be edited). In some implementations, the trusted portion may be provided within an inline frame ("iframe") of the webpage. The trusted portion may query the untrusted portion for any revisions, and the untrusted portion may respond with a list of revisions received from the user. In some implementations, the trusted portion may wait to receive an indication from the user that the revisions are complete and/or approved, and then may store the revision data to a database.

Figure 1:
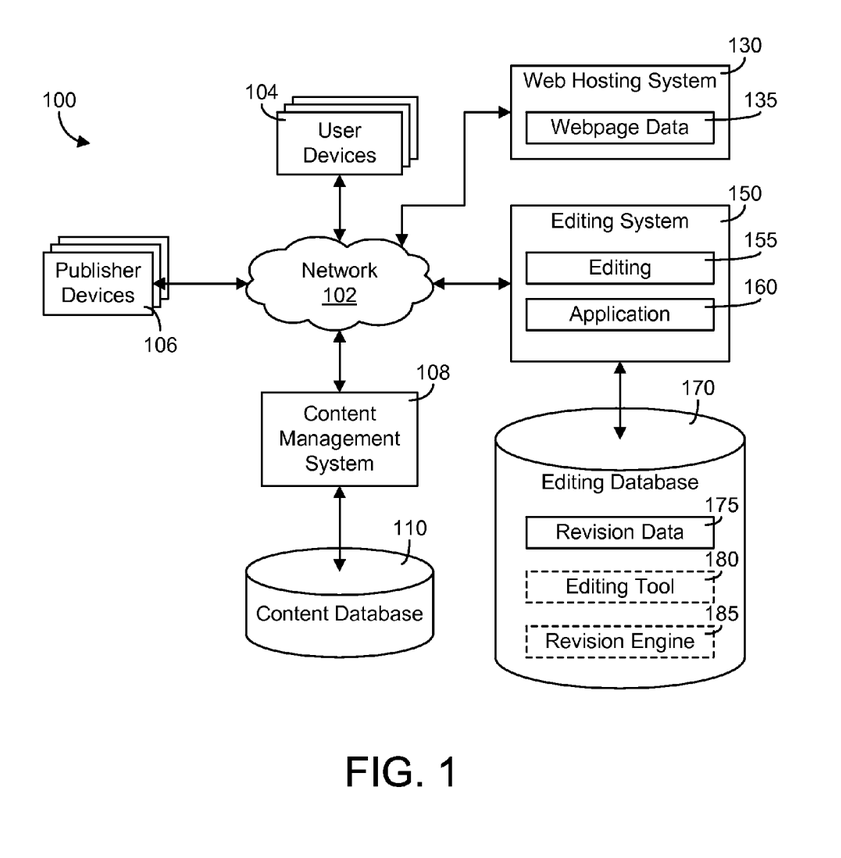
FIG. 1 is a block diagram of an editing system and associated environment according to an illustrative implementation.

Referring now to FIG. 1, and in brief overview, a block diagram of an editing system 150 and associated environment 100 is shown according to an illustrative implementation. One or more user devices 104 may be used by a user to perform various actions and/or access various types of content, some of which may be provided over a network 102 (e.g., the Internet, LAN, WAN, etc.). For example, user devices 104 may be used to access websites (e.g., using an Internet browser), media files, and/or any other types of content. A content management system 108 may be configured to select content for display to users within resources (e.g., webpages, applications, etc.) and to provide content items from a content database 110 to user devices 104 over network 102 for display within the resources. The content from which content management system 108 selects items may be provided by one or more content providers via network 102 using one or more content provider devices (not shown). In some implementations, content management system 108 may select items to be presented to users using one or more types of auction processes. For example, content providers may submit bids for content to be presented to users, and the content may be selected for presentation based at least in part on the bids. The content may be presented within one or more content interfaces within webpages or other resources.

Webpages may be presented to users on user devices 104, for example, using browser applications operating on user devices 104. The browser application of a user device 104 may navigate to an address at which a webpage is hosted (e.g., by entering a uniform resource locator, or URL, into a navigation interface of the browser). In response, a web hosting system 130 may transmit webpage data 135 representing the content of the webpage to the user device 104 via network 102. In some implementations, webpage data 135 may be or include hypertext markup language, or HTML, data. In some implementations, webpage data 135 may include one or more scripts (e.g., JavaScript) configured to perform certain functions of the webpage. For example, a script embedded in the webpage data may obtain content (e.g., text, images, video, etc.), such as marketing content items, and embed the content within the webpage, obtain input from users, modify an appearance of one or more webpage elements, etc. In some implementations, scripts or other elements within the webpage may allow for other scripts or elements to be dynamically added to the webpage (e.g., during rendering by the browser). Webpage data 135 representing the webpage to be hosted may be transmitted to web hosting system 130 from one or more publisher devices 106 (e.g., operated by a website owner, a web developer contracted to develop the webpage for the owner, etc.).

Editing system 150 allows publishers to edit their webpages and use the edits to temporarily or permanently change webpage data 135. Editing system 150 is configured to provide an editing tool 180 through which publishers can edit portions of a webpage using publisher devices 106. Editing tool 180 generates an interface for receiving revisions from the publisher. At least a portion of the interface generated by editing tool 180 is provided within the domain of the webpage. For example, editing tool 180 may receive an identifier, such as a URL, of a webpage to be edited from the user (e.g., the webpage owner). Editing tool 180 may monitor webpages to which a browser navigates and determine whether a current webpage is the webpage to be edited using the identifier. When editing tool 180 determines the current webpage is the webpage to be edited, in some implementations, editing tool 180 may inject an editing interface into the code of webpage data 135 or otherwise provide the interface within the browser. By providing at least a portion of the interface within the domain from which the webpage originates, the page being viewed by the user during editing can be exactly the same as what the user would see if the user directly visited the page in a separate window. Additionally, the interface can avoid problems associated with reverse-proxy editors, such as significant latency during loading and/or problems rendering content employing frame-busting features. Revisions made using editing tool 180 may be transmitted back to editing system 150 and stored in an editing database 170 for subsequent implementation within the webpage (e.g., by transmitting a modified webpage and/or change instructions to web hosting system 130 and/or user devices 104 rendering the webpage).

Referring still to FIG. 1, and in greater detail, user devices 104 and/or publisher devices 106 may be any type of computing device (e.g., having a processor and memory or other type of computer-readable storage medium), such as a mobile communication device (e.g., cellular telephone, smartphone, etc.), computer and/or media device (desktop computer, laptop or notebook computer, netbook computer, tablet device, gaming system, etc.), television and/or set-top box, or any other type of computing device. In some implementations, one or more user devices 104 may be set-top boxes or other devices for use with a television set. In some implementations, content may be provided via a web-based application and/or an application resident on a user device 104. In some implementations, user devices 104 and/or publisher devices 106 may be designed to use various types of software and/or operating systems. In various illustrative implementations, user devices 104 and/or publisher devices 106 may be equipped with and/or associated with one or more user input devices (e.g., keyboard, mouse, remote control, touchscreen, etc.) and/or one or more display devices (e.g., television, monitor, CRT, plasma, LCD, LED, touchscreen, etc.).

User devices 104 and/or publisher devices 106 may be configured to receive data from various sources using a network 102. In some implementations, network 102 may include a computing network (e.g., LAN, WAN, Internet, etc.) to which user devices 104 and/or publisher device 106 may be connected via any type of network connection (e.g., wired, such as Ethernet, phone line, power line, etc., or wireless, such as WiFi, WiMAX, 3G, 4G, satellite, etc.). In some implementations, network 102 may include a media distribution network, such as cable (e.g., coaxial metal cable), satellite, fiber optic, etc., configured to distribute media programming and/or data content.

Editing system 150 provides an editing tool 180 through which publishers using publisher devices 106 can make revisions to a webpage. Editing system 150 may transmit data to publisher devices 106 configured to cause an interface to be provided on publisher devices 106 through which the publisher can provide revisions. In some implementations, editing tool 180 may be provided as a web-based interface, such as a website provided by a frontend interface of editing system 150. In some implementations, editing tool 180 may be implemented as a script, browser plugin/extension, etc. operating on publisher devices 106 (e.g., within and/or in communication with a browser application operating on publisher devices 106).

System 150 may include one or more modules (e.g., implemented as computer-readable instructions executable by a processor) configured to perform various functions of system 150. An editing module 155 may be configured to provide editing tool 180 to publisher devices 106, receive revision data reflecting modifications to webpages from publisher devices 106, and store the revisions data in editing database 170 for subsequent implementation within the webpages. Editing module 155 may cause editing tool 180 to be provided to publisher devices 106, for example, by transmitting data (e.g., HTML data) to publisher devices configured to cause one or more web-based interfaces (e.g., webpages) to be provided in which revisions to webpages of the publisher may be entered. In some implementations, editing module 155 may transmit an application, script, browser plugin/extension, or other data to publisher devices 106 configured to cause editing tool 180 to be installed on publisher devices 106 or otherwise operate on one or more processors of publisher devices 106. In some implementations, portions of the functionality of editing tool 180 may be implemented within editing system 150, other portions may be implemented within publisher devices 106 (e.g., via a script or plugin), and the portions may work in concert to implement the features of editing tool 180.

System 150 may also include an application module 160 configured to implement edits to webpages. Application module 160 may provide a revision engine 185 configured to implement changes to webpage data 135 based on revision data 175. In some implementations, revisions engine 185 may be implemented as a script, browser plugin/extension, application, etc. For example, application module 160 may transmit data to user devices 104 configured to cause revision engine 185 to be implemented within and/or in communication with a browser application operating on user devices 104. In some implementations, revision engine 185 may receive revision data 175 representing changes to one or more webpages, and may implement the changes within the browser application on a user device 104. For example, a user device 104 browser may navigate to a particular webpage. Web hosting system 130 may transmit webpage data 135 to user devices 104 for parsing and rendering by the browser. In some implementations, webpage data 135 may include a script (e.g., set of instructions) configured to request edits from editing system 150. In response, editing system 150 may transmit revision data 175 to the user device 104, and revision engine 185 may implement the revisions. In some implementations, revision data 175 may include one or more change instructions, where each change instruction is configured to cause a change to be made to one or more elements of webpage data 135. In some implementations, system 150 may generate a revised webpage and transmit the revised webpage data to web hosting system 130 to replace webpage data 135 with the updated webpage.

Figure 2:
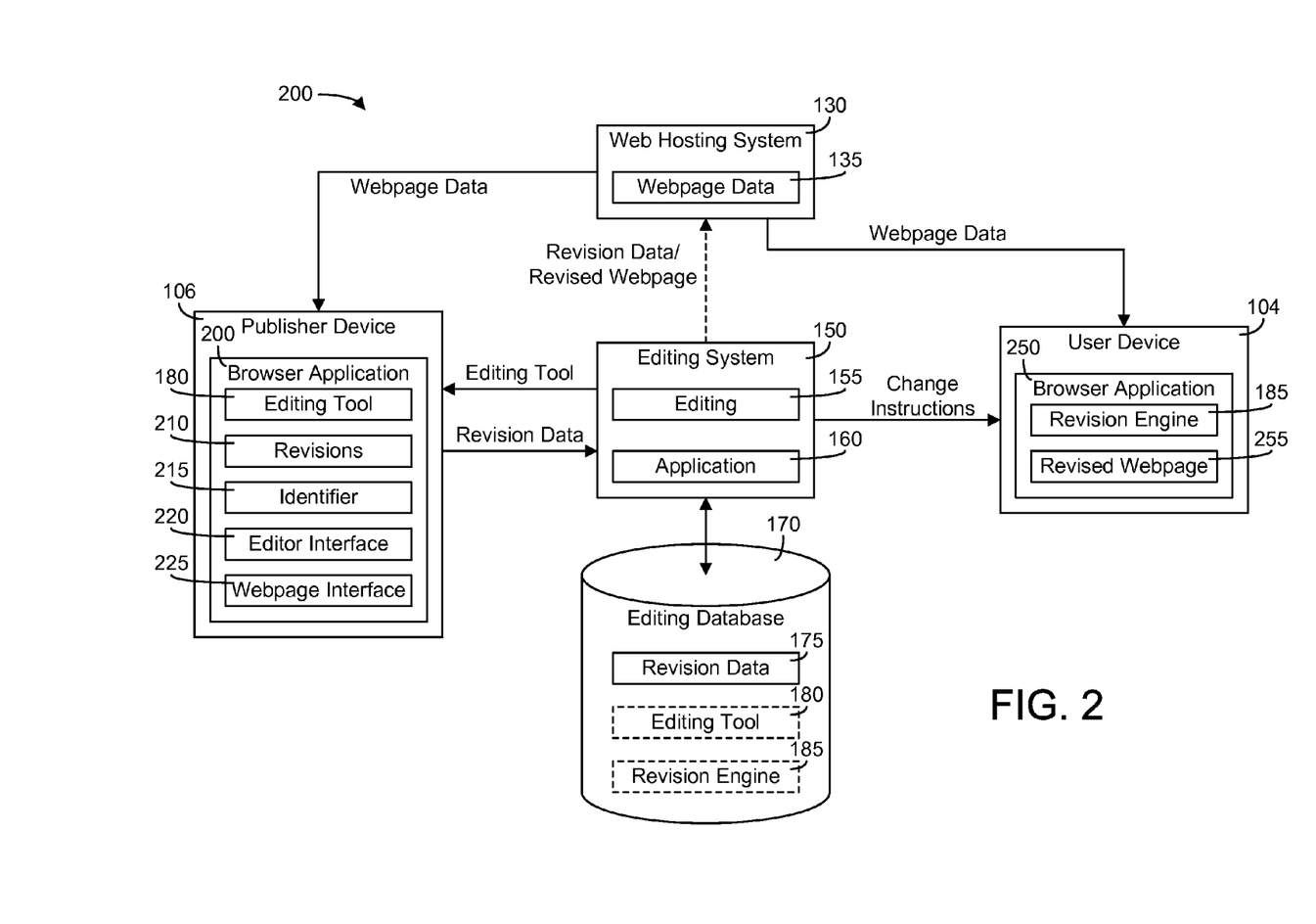
FIG. 2 is a block diagram of a detailed implementation of the editing system of FIG. 1 according to an illustrative implementation.

Referring now to FIG. 2, one detailed illustrative implementation 200 of editing system 150 and its associated environment is provided. It should be understood that the detailed implementation of editing system 150 and the environment shown in FIG. 2 is provided for purposes of illustration, and in other implementations, editing system 150 and its associated environment may include additional, fewer, and/or different components. Further, each of the illustrated systems and/or components may be implemented as a separate computing system, multiple systems may be combined within a single hardware system, and/or one or more systems or components may be implemented in a cloud, or distributed computing, environment.

Editing system 150 may transmit data to a publisher device 106 configured to cause the publisher device 106 to operate editing tool 180 on the publisher device 106. In various implementations, editing tool 180 may be implemented as a script (e.g., JavaScript®) transmitted to publisher device 106, a plugin, browser extension, or other application installed on publisher device 106, one or more webpages transmitted from editing system 150 to publisher device 106, etc. In some implementations, part or all of editing tool 180 may operate and/or be implemented as a script injected into the code of webpage data 135 and/or implemented within browser 200. For example, in various implementations, as described in further detail below, an editing interface may be provided by injecting a script into webpage data 135 using a plugin/extension to browser 200, using parameters of existing code embedded in webpage data 135, using a bookmarklet of browser 200 (e.g., an application stored in a bookmark of browser 200), or through another method.

A browser 200 (e.g., a browser application executing on the device 106) may communicate with editing tool 180 to implement an interface for receiving revisions 210 from a publisher or other user. In some implementations, editing tool 180 may execute within browser 200; in other implementations, editing tool 180 may be a separate application executing on publisher device 106 that communicates with browser 200. Publisher device 106 may also receive webpage data 135 from web hosting system 130 for a webpage to be edited using editing tool 180.

Editing tool 180 generates an interface (e.g. a WYSIWYG interface) for presentation within browser 200 that allows a user to revise one or more portions of webpage data 135. In some implementations, browser 200 may parse webpage data 135 and generate a data structure for use by editing tool 180 including the elements of the webpage. Editing tool 180 may use the data to generate an interface including an editable representation of the webpage. A publisher or other user of editing tool can provide input via publisher device 106 representing revisions 210 the user wishes to make to the content of the webpage. Editing tool 180 may receive revisions 210 and generate revision data 175 representing the revisions for transmission back to editing system 150. Revision data 175 may be stored in editing database 170 for subsequent implementation within a webpage. In some implementations, editing system 155 may implement revision data 175 in webpage data 135 to generate a revised webpage and transmit the revised webpage 135. In some implementations, editing system 155 may transmit revision data 175 (e.g., change instructions) to web hosting system 130, and a script or application operating on web hosting system 130 may modify webpage data 135 using revision data 175.

Editing system 150 may transmit revision data 175 to a user device 104 to implement changes to one or more elements of webpage data 135 for presentation to a user via a browser 250 (e.g., browser application) on the user device 104. In some implementations, editing system 150 may transmit data to the user device 104 configured to cause the user device 104 to operate revision engine 185 on the user device 104. In some implementations, revision engine 185 may be implemented as a script transmitted to the user device 104.

Revision engine 185 communicates with browser 250 to implement revision data 175 and change one or more elements of the webpage presented within browser 250 to generate a revised webpage 255. In some implementations, webpage data 135 includes one or more embedded instructions, scripts, parameters, etc. configured to cause browser application 250 and/or revision engine 185 to transmit a request to editing system 150. In response to the request, editing system 150 may determine whether any revision data 175 stored in editing database 170 should be transmitted to the user device 104. In some implementations, editing system 150 may determine whether any of the revision data 175 is directed to the webpage associated with the request (e.g., the webpage being rendered on the user device 104) and, if so, transmit the relevant revision data 175 to the user device 104.

In some implementations, editing system 150 may determine whether to transmit revision data 175 and/or what data to transmit based on one or more of various parameters (e.g., device type of user device 104, characteristics of a user of device 104, how many times the revision data for the webpage has been transmitted to user devices, an amount of time since revisions for the webpage have been transmitted to user devices, etc.). In one particular example, the revisions may be associated with an experiment defined by the publisher in which the revisions are to be shown to only a threshold number of users who view the webpage (e.g., five percent of users). In such an example, editing system 150 may transmit the revisions in response to only the threshold number of the requests to facilitate the experiment. Analytics data (e.g., viewing data, click data, conversion data, etc.) may then be collected from the user devices 104 in which the revisions were implemented and/or the user devices 104 in which the changes were not implemented to determine a performance outcome of the changes (e.g., whether the changes increased or decreased user engagement with the website, resulted in a greater number of hits, clicks, sales, etc.). For example, an experiment may be set up to support multivariate testing with multiple independent factors, each of which may have one or multiple levels. One example experiment may be configured to have one factor that varies the font color of the page and another factor that varies the font size. If an experiment includes a single factor with n variations, this can be set up as an A/B/n test. In another example, the revisions may be used to provide customizations for only certain users or devices, and editing system 150 may determine whether to transmit revision data 175 to the user device 104 based on whether the revisions are intended for the user/device of the device 104 (e.g., based on a device type and/or device identifier of the device 104, characteristics of a user of the device 104, etc.).

In some implementations, revision engine 185 may generate revised webpage 255 by implementing one or more change instructions received from editing system 150. Each change instruction may change one or more elements of webpage data 135, such as text, formatting, position, color, shading, etc. of the elements. Revision engine 185 may receive the instructions, identify one or more elements to which the instructions apply within the parsed webpage data from browser 250, and apply the changes to the webpage data.

Figure 3:
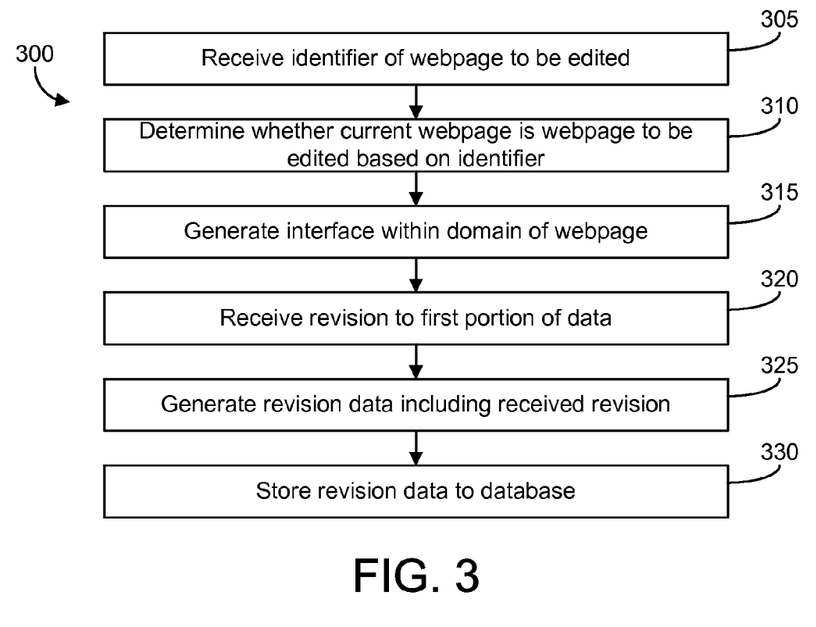
FIG. 3 is a flow diagram of a process for editing a webpage within a domain of the webpage according to an illustrative implementation.

Editing tool 180 may provide an interface for editing webpage data from within the domain of the webpage. FIG. 3 illustrates a flow diagram of a process 300 for editing a webpage within the domain of the webpage according to an illustrative implementation. Process 300 may be executed by, for instance, editing tool 180 and/or editing system 150 and may be configured to generate an interface for providing revisions to a webpage directly within the domain of the webpage. Providing edits within the domain of the webpage may allow the user to have a true WYSIWYG editing experience, where the webpage looks as it normally would, including customizations behind a login/paywall. Additionally, problems associated with reverse proxy editing may be reduced or eliminated.

Referring to FIGS. 1 through 3, in some implementations, editing tool 180 receives an identifier 215 of a webpage to be edited (305). In some implementations, identifier 215 may include a partial or complete URL of the webpage to be edited. For example, an interface may be provided through which the user may enter one or more URLs corresponding to webpages the user wishes to revise. In some implementations, the interface may allow a user to specify a domain, and editing tool 180 may be configured to provide an interface for all pages within the domain. In some implementations, the interface for receiving identifier 215 may be provided through a website in a different domain than the webpage to be edited (e.g., a website generated by a provider of editing tool 180). In some implementations, the interface may provide an option to navigate to the webpage (e.g., in a separate browser tab) and begin editing the webpage. In some implementations, the user may indicate an intention to edit a webpage by activating a browser bookmarklet, extension/plugin, etc. when at the URL of the webpage to be edited.

Editing tool 180 may determine whether a current webpage is the webpage to be edited using identifier 215 (310). In some implementations, if the user identifies an indication to edit the current webpage, such as by clicking a plugin/extension or bookmarklet while on a page, editing tool 180 may determine the current webpage is the webpage to be edited. In some implementations, the user's intent to edit the webpage is recorded for later reference (e.g., the identifier is recorded). For example, identifier 215 or other data indicating the intent to edit may be stored in a cookie on the editor's domain (e.g., in editing database 170), in browser 200 storage (e.g., at the editor's domain), in a browser extension/plugin or bookmarklet, in a token, etc. In some implementations, the determination of whether the current webpage is the webpage to be edited may be based at least in part on a comparison of the identifier to the URL of the current webpage. The current webpage may be determined to be the webpage to be edited in response to a partial or complete match, in various implementations. For example, in some implementations, editing interface 180 is configured to require an exact match between the URL associated with the identifier and the URL of the current webpage to determine the current webpage is the webpage to be edited. In some implementations, editing interface 180 is configured to determine the current webpage is the webpage to be edited in response to a "soft" match, or a partial match. For example, in some implementations, editing interface 180 may determine the current webpage is the page to be edited in response to detecting the domain associated with the identifier matches the domain of the current URL. In some implementations, additional or alternative conditions may be considered, such as whether the current browser tab or window is the browser tab/window opened by editing interface 180 for providing edits.

In some implementations, a token may be used to embed and/or encode information used to cause an editing interface to be launched. For example, the token may include information used to cause already-present code in webpage data 135 to launch an in-page editing interface. In some implementations, the token may include data regarding the user launching the editor and/or parameters relating to the editing (e.g., an identifier of an experiment associated with the editing). The embedded code in webpage data 135 may recognize the token, verify the current webpage is the webpage to be edited (e.g., based on the token and/or identifier 215), and launch the interface in response. In some implementations, the token may be appended to the URL of the webpage to be edited. For example, to edit a webpage example.com, the URL example.com/#editor=<token> may be entered into a navigation bar of browser 200. Code in the example.com HTML data may retrieve the token and, in response, launch an in-page editor.

Editing tool 180 generates an interface that is at least partially provided within the domain of the webpage in response to determining the current webpage is the webpage to be edited (315). Editing tool 180 may generate a graphical interface including an editable representation of the webpage. In some implementations, the editable representation may be a WYSIWYG editable interface including the webpage in substantially the same form in which it would appear if browser 200 navigated to the webpage without the editing interface. For example, the displayed editable webpage may include customizations applied after the user logs into a login interface on the webpage/website (e.g., behind a paywall or other authentication interface). Such customizations may be unavailable using reverse proxy methods. In some implementations, all content of the webpage may be displayed, including content available under hypertext transfer protocol (HTTP) that may not be available when the protocol is elevated to secure HTTP (HTTPS). Reverse proxy methods may load the webpage under a HTTPS domain behind an editor user authentication, and may not have access to such content. In some implementations, the interface may edit the webpage using tools similar to what the user might find in a rich document editing environment (e.g., rather than editing the page HTML or CSS).

In some implementations, editing tool 180 may generate an interface having multiple parts. For example, editing tool 180 may generate an editor interface 220 and a webpage interface 225. Editor interface 220 may be a portion of the interface that is trusted and is allowed to communicate with editing system 150 and/or editing database 170 (e.g., through editing system 150). Webpage interface 225 may be a portion of the interface that is untrusted and/or uncontrolled by editing system 150, and is restricted from communicating directly with editing system 150 (e.g., can only communicate with system 150 through editor interface 220). In some implementations, webpage interface 225 may be provided within the domain from which the webpage originated and may include the editable representation of the webpage. In some implementations, editor interface 220 may be provided within and/or controlled by a separate domain, such as a domain of editing system 150. For example, editor interface 220 may be loaded within an inline frame (iframe) of the webpage, and at least a portion of the content of the iframe may be controlled by editing system 150. Editor interface 220 may establish a communication channel with webpage interface 225 (e.g., in response to determining the current webpage is the page to be edited, such as by detecting an exact or partial match between URLs) to receive revision data. In implementations in which editor interface 220 and webpage interface 225 are provided in different domains, the communication channel may facilitate cross-domain communication of data. By providing separate portions, editing tool 180 can read and write to a user's account structure at editing system 150, such as by using HTTPS, and the editable content may be provided in the browser URL (e.g., webpage domain). In some implementations, using a multiple part interface may help prevent mixed-content blocking in which browser 200 may block HTTP content in a page served over HTTPS that tries to include content served over HTTP.

Editing tool 180 may receive one or more revisions to the webpage data (320). The revisions may be received from a user of editing tool 180 through the editable portion(s) of the interface. Editing tool 180 may generate revision data 175 using the received revisions (325). Revision data 175 may be stored to editing database 170 for subsequent implementation within the webpage (330). In some implementations, editing tool 180 may provide interface elements through which the user may specify one or more parameters associated with the revisions, such as parameters of an experiment or user customization to which the revisions are to be applied. In some implementations, editing tool 180 may provide interface elements allowing a user to cancel one or more revisions and/or accept one or more revisions provided through the interface. In some implementations, editing tool 180 may wait to receive an indication that the revisions are complete before generating revision data 175 and/or storing revision data 175 to database 170.

In some implementations, a user may provide revisions 210 at least in part through interactions with webpage interface 225. Revisions 210 may be entered within webpage interface 225 (e.g., a WYSIWYG interface including a representation of the edited webpage). Webpage interface 225 may communicate the revisions to editor interface 220 through the established communication channel. In some implementations, editor interface 220 may query webpage interface 225 (e.g., periodically) for any revisions entered by the user. In response, webpage interface 225 may transmit a list of revisions to editor interface 220. In some implementations, editor interface 220 may provide the user with a list of revisions that have been received. In some implementations, editor interface 220 may provide an option for the user to accept or reject the changes collectively, individually, in groups, etc. Editor interface 220 may transmit the revisions to editing system 150 for storage in editing database 170 and later implementation. In some implementations, editor interface 220 may wait to receive an indication of approval from the user before transmitting revisions to editing system 150.

In some implementations, at least some of the revisions may be received via editor interface 220. For example, a user may select an item in webpage interface 225 for editing, and editing interface 220 may display options for editing the item. The user may provide revisions directly in editor interface 220. In some implementations, revisions provided via editor interface 220 may be shown in webpage interface 225 (e.g., to illustrate an effect of the changes on the webpage if the changes were implemented).

Figure 4:
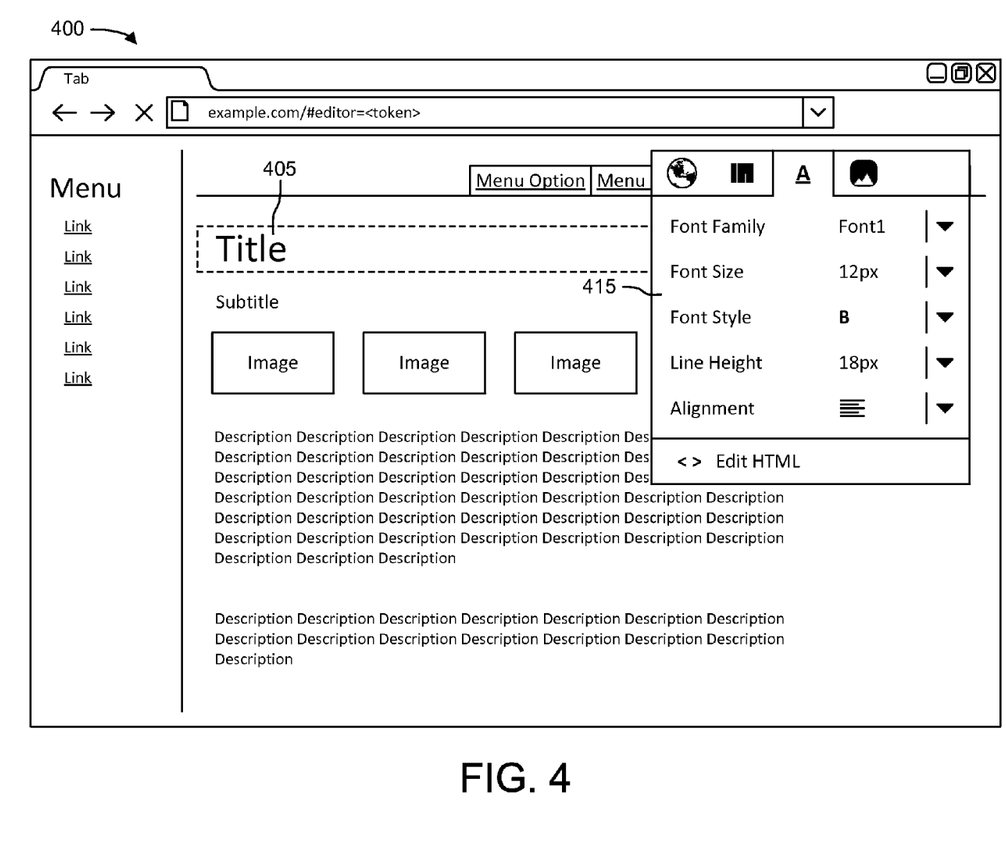
FIG. 4 is an illustration of an interface for editing a webpage according to an illustrative implementation.

Referring now to FIG. 4, an illustration of an interface 400 through which revisions to a webpage can be provided is shown according to an implementation. User interface 400 includes a representation of a webpage including an element 405. User interface 400 includes an interface portion 415 providing options for the user to edit element 405. For example, portion 415 includes options for the user to edit a font family, font size, font style, line height, alignment, and/or other characteristics of element 405. In some implementations, the options provided via portion 415 may change contextually (e.g., based on the type, location, etc. of the selected element). In some implementations, portion 415 may appear in response to the user selecting element 405, such as through a right click on element 405. In some implementations, interface 400 may appear in an interface within the domain from which the illustrated webpage originates. In some implementations, portions of interface 400 (e.g., portion 415) may be provided within a separate trusted interface portion, such as an iframe controlled at least in part by an editor domain. In some implementations, the editing portions of interface 400 may be triggered based at least in part on the token appended to the URL, as illustrated in the navigation bar of interface 400.

Figure 5:
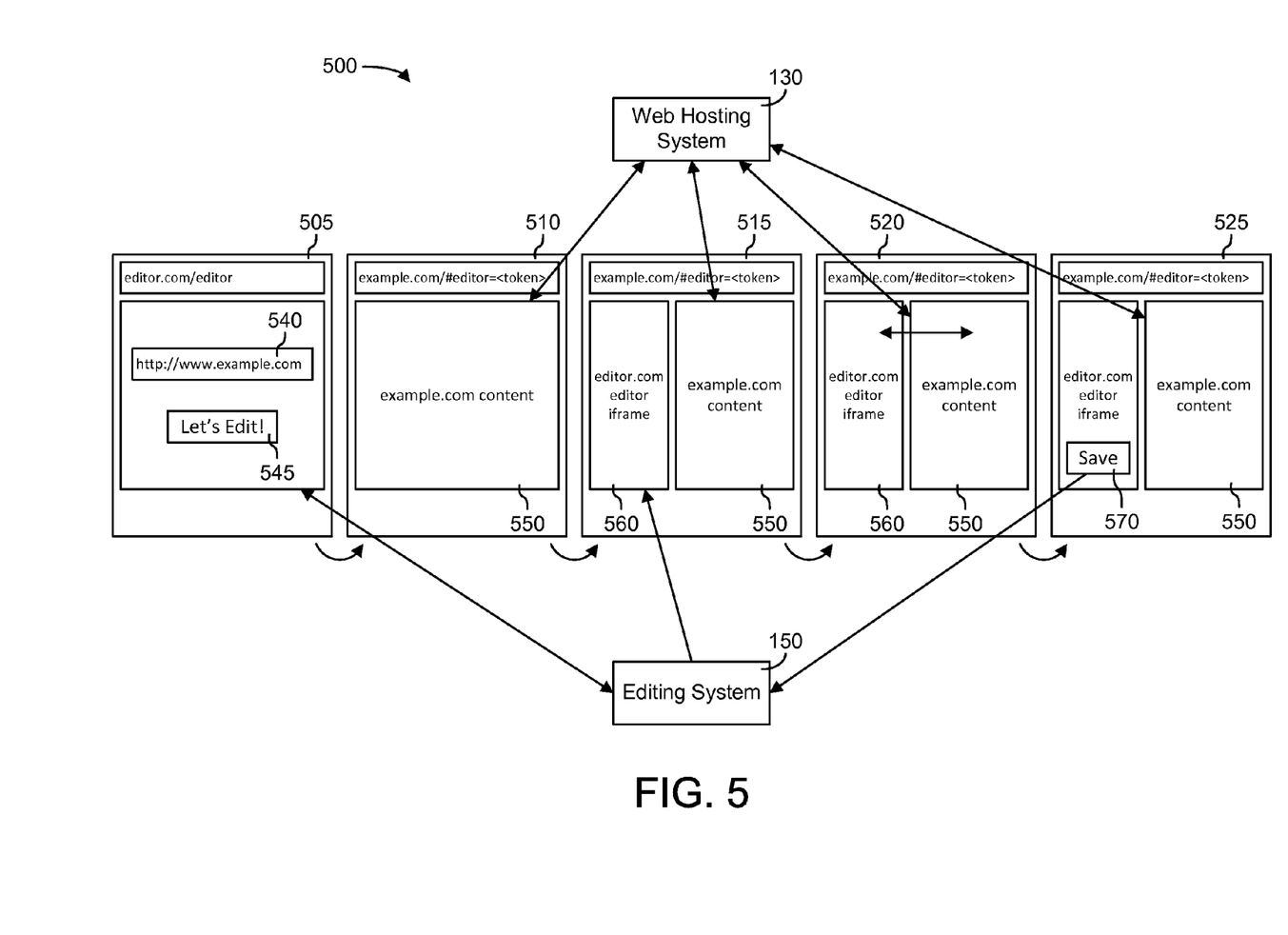
FIG. 5 is an illustration of a process flow for providing an interface for receiving revisions to a webpage within a domain of the webpage according to an illustrative implementation.

FIG. 5 illustrates a process flow 500 for providing an interface for receiving revisions to a webpage within a domain of the webpage according to an illustrative implementation. FIG. 5 and the associated passages below provide a particular implementation of a method for providing an interface for receiving revisions within a domain of a webpage. It should be understood that the various features discussed below can be used independently or in combination with one another in various implementations. Additionally, it should be understood that various features discussed below can be used in combination with implementations discussed above with respect to FIGS. 1 through 4.

In some implementations, an editing interface may be triggered (e.g., through injection of a script) by code already embedded in the content of the webpage data. The code may be utilized to bootstrap the editor. One or more identifiers may be available to the editing tool. For example, an account ID may identify a user or account associated with the editor, a container ID may identifier a container, or data structure, storing details of one or more experiments associated with the account, and an experiment ID may identify an experiment/customization established using the editing tool.

Consider that a user is setting up a multivariate experiment for a goal funnel that involves pages A, B, and C. The first factor of the experiment is on page A, where a product image will be changed. The second factor of the experiment is also on page A, where the product description will be emphasized. The third factor of the experiment is on page B where the text on a call-to-action button will be changed. Page C is the destination of the funnel.

In the editor interface, the user will specify the URL for page A and launch into in-page editing of page A. The user will start with a single factor and set up three image variations. The user will then add another factor and have an opportunity to either stay on the same page or enter a new URL for the second factor. The user stays on the same page and emphasizes the product description as that factor's variation. The user then adds a third factor, but this time specifies the URL for page B. This will relaunch the editor on page B, prompting the user to save page A edits if necessary prior to navigating. The user changes the call to action as a single variation on page B and saves the entire experiment which will navigate the user back to the editor user interface.

A detailed discussion of a single page edit from the previous example workflow will not be provided according to an illustrative implementation. Process flow 500 gives a high level overview of the interaction details.

In interface 505, provided within a domain of the editor, the user enters a URL of a webpage to be edited in a URL box 540 and submits the URL by clicking edit button 545. The editing tool creates a new experiment with a single factor. At this point, the editing tool may have a URL as well as an account ID, experiment ID, and/or other types of identifiers. This information may be used to launch the in-page editor.

A secure token will be generated which will encode the information required to cause an already-present code snippet at the URL to launch the inpage editor. In some implementations, the token may be an encrypted token identifying the user and a key to the entity the user would like to edit. For example, in some implementations, the token may include an identifier for an account of the user, the page to be edited, an experiment with which the token is associated, and/or other other data.

The generated token will be appended as a fragment on the destination URL. For example, if the URL to edit is example.com, then the URL which will spawn the editor could be example.com/#editor=<token>. The fragment may be used to store the token for a number of reasons: it will not be sent on the http request for the page to be edited, so the foreign server will not have opportunity to reject the request; the fragment usually survives server-side redirects in modern browsers; and the fragment is also not sent with the referer header, which prevents it from leaking through that mechanism. If, for whatever reason, the token in the fragment does not survive for a particular site/browser, in some implementations, users may use a browser extension approach as discussed in further detail below.

When the URL with the token is prepared, the editor will then navigate the user's window to the that URL (e.g. example.com/#goptedit=<token>) (510). When the page loads, if it has a particular type of code snippet, the snippet will check for the token. If a token is present, then the snippet will source the foreign portion 550 (e.g., webpage portion) of the editor.

In some implementations, the foreign portion of the editor can be statically served from the same service as the main editor user interface. The token can be sent on the request as this is the first opportunity to gate the loading of the editor. If the token is valid, then the bundle containing the foreign portion of the editor will return. Otherwise, an empty or error-messaging bundle may be returned.

When the foreign portion of the editor script loads, it may add an initially invisible <iframe> of the editor domain portion 560 of the editor with a channel to support the editor's cross-frame communication (515 and 520). The foreign portion of the editor can expose services to the editor domain portion of the editor on the channel, and vice versa.

The editor domain portion of the editor can be served via the same framework and service as the main editor user interface and follow the same security guidelines, in some implementations. In some implementations, the frame-busting prevention may be loosened, as it will be placed in an <iframe>. In some implementations, measures may be taken to prevent the editor from launching on a page other than the one the user intends to edit, as discussed in further detail below.

When requesting the editor domain portion of the editor, the editor may rely on the fact that the user is still authorized as they just came from a logged-in experience. In some implementations, the token may provide the key for what data to load into the editor. Some measures may be taken to prevent the editor from launching on a page other than the one the user intended to edit. In some implementations, the editor may restrict the origin of messages received using a cross-domain communication channel (e.g., channel between the two interface portions associated with the different domains). This may be used to restrict editing to the origin that the user specified when initiating the edit from the original editor interface (505). As the origin restriction option may allow for only a single origin to be specified, to allow the editor to still load following some redirects (such as http→https or even a subdomain change), in some implementations, the origin may be specified dynamically during redirects. The origin of the foreign document will be reported to the editor domain portion of the editor as an 'origin' parameter in the URL for the editor domain portion of the editor. The origin parameter may not be used server-side, but may be used client-side to resolve the allowed origin against the one entered by the user that is found in the loaded experiment data. In the case of significant change, such as a top-level domain change, the editor may not launch because the foreign portion of the editor's messages may be rejected by the editor domain portion of the editor. The user may return back to the editor user interface (505) to input the URL that they were redirected to in order to edit that page.

If the foreign document origin is acceptable, the editor domain portion of the editor can successfully use the channel to initialize the editor across the two frames. The channel is then used to edit the page. If the editor does not respond within a reasonable amount of time or responds with an error, then the foreign portion of the editor may not initialize, but will instead show an error message to the user.

The interaction with the foreign content of the page under edit has some security implications. The editor domain portion of the editor may not trust the foreign content, but interacts with it to support WYSIWYG editing. In some implementations, the information provided from the editor domain portion to the foreign portion may be restricted.

Suppose that there already exists a draft experiment that has some page edits. If an editor launches for this experiment, it can try to apply edits to the page, passing that information to the foreign content. The editor for this experiment can be launched using a valid token and an authorized user. The token, however, may only be scoped to a top-level domain, not scoped to a particular page. So, a malicious page that has obtained a token and an authorized user can listen to the page edits for that token's experiment. This is an unlikely scenario and the draft page edits without additional context may not be particularly sensitive. However, in some implementations, the information passed to the foreign content may be restricted to be only edit-related information. Other experiment information, such as the experiment name, variation names, etc., may be maintained in the editor domain portion of the editor, in some implementations.

The editor domain portion of the editor may save a list of edits for the page variations and will rely on information obtained from the portion of the editor running in the foreign content. Suppose that a user is creating an experiment that will add a prominent phone number sitewide and the particular page that they've selected to edit to prepare this change has some malicious code on it that compromises the foreign portion of the editor. The editor is compromised in such a way that when the user selects an arbitrary HTML element to edit to insert a phone number <div>, it reports that the selected element also has a malicious <script> as one of its children. The user adds the phone number, ignores the script, and saves. If the experiment runs and is triggered on every page on the site, the phone number will be present and accompanied by the malicious script. What was a malicious script on one page could be propagated site-wide.

To address this issue, in some implementations, site changes do not occur until a container is published. Organizations may restrict which users have publish permission to those who would normally be allowed to make site changes. A container snapshot can be vetted prior to pushing experiments live to a site. In some implementations, to-be-published edits may be presented in a user-friendly way and potentially highlight arbitrary html or javascript changes.

Some addition features could be added in some implementations to prevent against such attacks. Consider the case where all of the editing occurs in the foreign portion of the editor and then at the very end, when the user clicks the save button in the editor domain portion of the editor, it queries the foreign portion for the list of edits. The foreign portion of the editor could respond with any information, including malicious data. In some implementations, the editor domain portion of the editor could be in the loop of each of the edits as they occur. This limits the number of changes to be the number of changes initiated by the user. In some implementations, this may require that for any type of edit, the user take at least a single action in the editor domain portion of the editor (e.g. click done when a specific edit is completed).

In some implementations, all edits could be initiated by the editor domain portion of the editor where the user selects an edit type. For example, the user would select an element in the foreign content, and a list of available edit types would be shown in the editor domain portion of the editor. The user would select the type of edit they want to perform, and then that is the only type of edit accepted when the user clicks done.

When the user has finished editing all variations of the page, the user may click the 'save' button 570 in the editor domain portion of the editor, securely submitting the changes to the account/container/experiment specified by the token and authorized by the user (525). On a successful save, in some implementations, the foreign portion of the editor will be notified and navigate the window to the experiment configuration in the main editor user interface.

In some implementations, a browser plugin/extension or bookmarklet may be used to inject the editor. The extension may run a script on each page to check for the presence of a token stored in the extension. If the token is present and live and the information in the token (e.g., the top level domain) matches the page, the page may load the editor.

Figure 6:
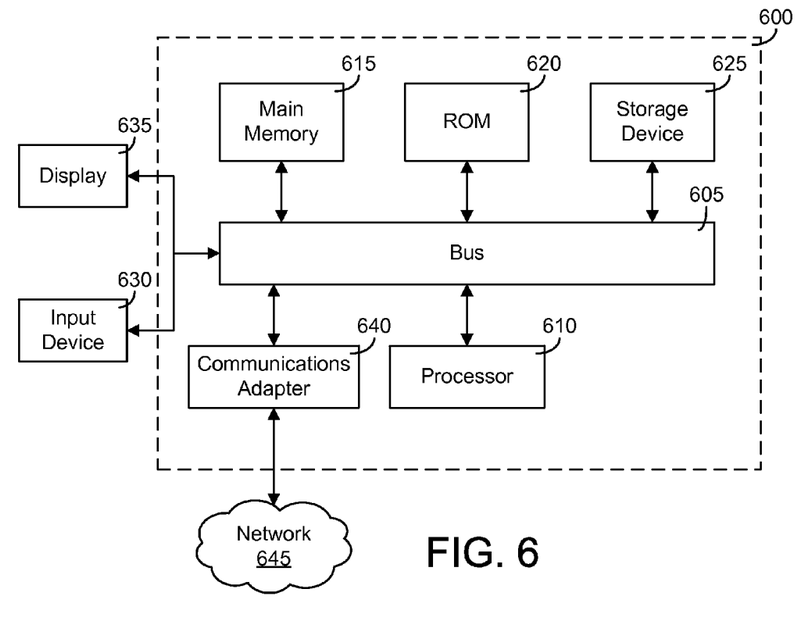
FIG. 6 is a block diagram of a computing system according to an illustrative implementation.

FIG. 6 illustrates a depiction of a computer system 600 that can be used, for example, to implement an illustrative user device 104, an illustrative content management system 108, an illustrative publisher device 106, an illustrative editing system 150, and/or various other illustrative systems described in the present disclosure. Computing system 600 includes a bus 605 or other communication component for communicating information and a processor 610 coupled to bus 605 for processing information. Computing system 600 also includes main memory 615, such as a random access memory (RAM) or other dynamic storage device, coupled to bus 605 for storing information, and instructions to be executed by processor 610. Main memory 615 can also be used for storing position information, temporary variables, or other intermediate information during execution of instructions by processor 610. Computing system 600 may further include a read only memory (ROM) 610 or other static storage device coupled to bus 605 for storing static information and instructions for processor 610. A storage device 625, such as a solid state device, magnetic disk or optical disk, is coupled to bus 605 for persistently storing information and instructions.

Computing system 600 may be coupled via bus 605 to a display 635, such as a liquid crystal display, or active matrix display, for displaying information to a user. An input device 630, such as a keyboard including alphanumeric and other keys, may be coupled to bus 605 for communicating information, and command selections to processor 610. In another implementation, input device 630 has a touch screen display 635. Input device 630 can include a cursor control, such as a mouse, a trackball, or cursor direction keys, for communicating direction information and command selections to processor 610 and for controlling cursor movement on display 635.

In some implementations, computing system 600 may include a communications adapter 640, such as a networking adapter. Communications adapter 640 may be coupled to bus 605 and may be configured to enable communications with a computing or communications network 645 and/or other computing systems. In various illustrative implementations, any type of networking configuration may be achieved using communications adapter 640, such as wired (e.g., via Ethernet®), wireless (e.g., via WiFi®, Bluetooth®, etc.), pre-configured, ad-hoc, LAN, WAN, etc.

According to various implementations, the processes that effectuate illustrative implementations that are described herein can be achieved by computing system 600 in response to processor 610 executing an arrangement of instructions contained in main memory 615. Such instructions can be read into main memory 615 from another computer-readable medium, such as storage device 625. Execution of the arrangement of instructions contained in main memory 615 causes computing system 600 to perform the illustrative processes described herein. One or more processors in a multi-processing arrangement may also be employed to execute the instructions contained in main memory 615. In alternative implementations, hard-wired circuitry may be used in place of or in combination with software instructions to implement illustrative implementations. Thus, implementations are not limited to any specific combination of hardware circuitry and software.

Although an example processing system has been described in FIG. 6, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of editing content of a webpage, comprising:
   receiving, by one or more processors, an identifier of a webpage to be edited, the identifier comprising a uniform resource locator (URL) of the webpage;
   determining, by the one or more processors, whether a current webpage to which a browser application has navigated is the webpage to be edited based on comparing the URL of the webpage to the identifier, wherein the current webpage is determined to be the webpage to be edited in response to determining at least the domain of the URL matches the identifier;
   in response to determining the current webpage is the webpage to be edited, generating, by the one or more processors, an interface configured to receive revisions to content of the webpage, the interface provided within a domain of the webpage;
   receiving, by the one or more processors, the revisions to the webpage;
   generating, by the one or more processors, revision data including the received revisions; and
   storing, by the one or more processors, the revision data to a database for subsequent implementation within the webpage.

2. The method of claim 1, the step of generating the interface comprising injecting a script into the webpage, the script configured to generate the interface.

3. The method of claim 2, the step of injecting the script comprising injecting the script based in part on a token comprising information for generating the interface.

4. The method of claim 3, wherein the token is appended to the URL of the webpage.

5. The method of claim 2, the step of injecting the script comprising injecting the script using a plugin to the browser application.

6. The method of claim 2, the step of injecting the script comprising injecting the script using code present in the data of the webpage.

7. The method of claim 2, the step of injecting the script comprising injecting the script using an application stored in a bookmark of the browser application.

8. The method of claim 1, the interface including a first interface portion and a second interface portion, the first interface portion configured to communicate with the database and the second interface portion configured to communicate with the first interface portion and restricted from communicating with the database, wherein the revisions are entered within the second interface portion and transmitted from the second interface portion to the first interface portion, and wherein the first interface portion is configured to store the revision data to the database in response to receipt of an indication that the revisions are approved.

9. The method of claim 8, wherein the first interface portion is configured to establish a communication channel with the second interface portion in response to determining the current webpage is the webpage to be edited.

10. The method of claim 8, wherein the first interface portion is provided within an inline frame of the webpage.

11. A system comprising:
    at least one computing device having one or more processors operably coupled to at least one memory, the one or more processors configured to:
    receive an identifier of a webpage to be edited, the identifier comprising a uniform resource locator (URL) of the webpage;
    determine whether a current webpage to which a browser application has navigated is the webpage to be edited based on comparing the URL of the webpage to the identifier, wherein the current webpage is determined to be the webpage to be edited in response to determining at least the domain of the URL matches the identifier;

in response to determining the current webpage is the webpage to be edited, generate an interface configured to receive revisions to content of the webpage, the interface provided within a domain of the webpage;

receive the revisions to the webpage;

generate revision data including the received revisions; and store the revision data to a database for subsequent implementation within the webpage.

12. The system of claim 11, the one or more processors configured to generate the interface by injecting a script into the webpage based in part on a token comprising information for generating the interface, wherein the token is appended to the URL of the webpage.

13. The system of claim 12, the step of injecting the script comprising injecting the script using at least one of a plugin to the browser application, code present in the data of the webpage, or an application stored in a bookmark of the browser application.

14. The system of claim 11, the interface including a first interface portion and a second interface portion, the first interface portion configured to communicate with the database and the second interface portion configured to communicate with the first interface portion and restricted from communicating with the database, wherein the revisions are entered within the second interface portion and transmitted from the second interface portion to the first interface portion, and wherein the first interface portion is configured to store the revision data to the database in response to receipt of an indication that the revisions are approved, wherein the first interface portion is configured to establish a communication channel with the second interface portion in response to determining the current webpage is the webpage to be edited.

15. The system of claim 14, wherein the first interface portion is provided within an inline frame of the webpage.

16. One or more computer-readable storage media having instructions stored thereon that, when executed by one or more processors, cause the one or more processors to execute operations comprising:

receiving an identifier of a webpage to be edited, the identifier comprising at least a portion of a first uniform resource locator (URL) of the webpage to be edited;

receiving a second URL of a current webpage to which a browser application has navigated;

comparing the identifier to the second URL;

determining the current webpage is the webpage to be edited in response to determining at least a domain of the second URL matches the identifier;

in response to determining the current webpage is the webpage to be edited, generating an interface configured to receive revisions to content of the webpage, the interface comprising a first interface portion and a second interface portion, the step of generating the interface comprising:

providing the first interface portion within an inline frame;

providing the second interface portion outside the inline frame within a domain of the webpage; and establishing a communication channel between the first interface portion and the second interface portion in response to determining at least the domain of the second URL matches the identifier;

receiving the revisions to the webpage via the second interface portion;

transmitting the revisions from the second interface portion to the first interface portion via the communication channel;

generating revision data including the received revisions;

receiving an indication that the revisions are approved; and storing, by the first interface portion, the revision data to a database for subsequent implementation within the webpage, the second interface portion restricted from transmitting data to the database.

17. A method of editing content of a webpage, comprising:

receiving, by one or more processors, an identifier of a webpage to be edited;

determining, by the one or more processors, whether a current webpage to which a browser application has navigated is the webpage to be edited based on the identifier;

in response to determining the current webpage is the webpage to be edited, generating, by the one or more processors, an interface configured to receive revisions to content of the webpage, the interface provided within a domain of the webpage, wherein the generating the interface comprises injecting a script into the webpage based in part on a token comprising information for generating the interface, wherein the script is configured to generate the interface and the token is appended to the URL of the webpage;

receiving, by the one or more processors, the revisions to the webpage;

generating, by the one or more processors, revision data including the received revisions; and storing, by the one or more processors, the revision data to a database for subsequent implementation within the webpage.

18. A method of editing content of a webpage, comprising:

receiving, by one or more processors, an identifier of a webpage to be edited;

determining, by the one or more processors, whether a current webpage to which a browser application has navigated is the webpage to be edited based on the identifier;

in response to determining the current webpage is the webpage to be edited, generating, by the one or more processors, an interface configured to receive revisions to content of the webpage, the interface provided within a domain of the webpage;

receiving, by the one or more processors, the revisions to the webpage;

generating, by the one or more processors, revision data including the received revisions; and storing, by the one or more processors, the revision data to a database for subsequent implementation within the webpage;

wherein the interface includes a first interface portion and a second interface portion, the first interface portion configured to communicate with the database and the second interface portion configured to communicate with the first interface portion and restricted from communicating with the database, wherein the revisions are entered within the second interface portion and transmitted from the second interface portion to the first interface portion, and wherein the first interface portion is configured to store the revision data to the database in response to receipt of an indication that the revisions are approved.

19. The method of claim 18, wherein the first interface portion is configured to establish a communication channel with the second interface portion in response to determining the current webpage is the webpage to be edited.

20. The method of claim 18, wherein the first interface portion is provided within an inline frame of the webpage.

\* \* \* \* \*